US008014768B2

(12) United States Patent
Ackley

(10) Patent No.: US 8,014,768 B2
(45) Date of Patent: Sep. 6, 2011

(54) MOBILE PHONE MULTIMEDIA CONTROLLER

(75) Inventor: Jonathan Ackley, Glendale, CA (US)

(73) Assignee: Disney Enterprises, Inc., Burbank, CA (US)

(\*) Notice: Subject to any disclaimer, the term of this patent is extended or adjusted under 35 U.S.C. 154(b) by 0 days.

(21) Appl. No.: 10/837,236

(22) Filed: Apr. 30, 2004

(65) Prior Publication Data

US 2004/0259537 A1 Dec. 23, 2004

Related U.S. Application Data

(60) Provisional application No. 60/467,256, filed on Apr. 30, 2003.

(51) Int. Cl.
| | |
|---|---|
| *H04N 7/14* | (2006.01) |
| *H04N 7/173* | (2011.01) |
| *G05B 11/01* | (2006.01) |
| *G05B 23/02* | (2006.01) |
| *A63F 9/24* | (2006.01) |
| *A63F 13/00* | (2006.01) |
| *G06F 17/00* | (2006.01) |
| *G06F 19/00* | (2011.01) |

(52) U.S. Cl. ......... 455/420; 455/3.06; 455/68; 455/418; 455/419; 455/550.1; 455/556.1; 455/557; 348/14.04; 348/14.05; 700/11; 700/17; 700/19; 340/31; 340/3.71; 725/133; 725/141; 463/37; 463/38; 463/41

(58) Field of Classification Search .................. 455/3.06, 455/68, 352, 418–420, 425, 556.1, 557; 348/14.04, 348/14.05, 114, 211.99, 552, 734; 700/11, 700/17, 19, 65, 83; 340/3.1, 3.71, 5.61, 7.29, 539.1, 539.11, 539.14; 725/141, 153, 133; 463/37, 38, 41

See application file for complete search history.

(56) References Cited

U.S. PATENT DOCUMENTS

| | | | | |
|---|---|---|---|---|
| 4,456,925 | A | * | 6/1984 | Skerlos et al. ................ 348/552 |
| 5,138,649 | A | * | 8/1992 | Krisbergh et al. ............ 455/420 |
| 5,465,384 | A | * | 11/1995 | Bejan et al. .................. 455/2.01 |
| 5,671,267 | A | * | 9/1997 | August et al. ................. 455/420 |
| 5,695,400 | A | * | 12/1997 | Fennell et al. ................. 463/42 |
| 5,769,719 | A | * | 6/1998 | Hsu ................................. 463/37 |
| 5,790,201 | A | * | 8/1998 | Antos .......................... 348/552 |
| 5,806,849 | A | * | 9/1998 | Rutkowski ..................... 463/39 |
| 5,875,108 | A | | 2/1999 | Hoffberg et al. |

(Continued)

FOREIGN PATENT DOCUMENTS

CN 1296355 A 5/2001

(Continued)

*Primary Examiner* — Stephen M D'Agosta
(74) *Attorney, Agent, or Firm* — Ference & Associates LLC

(57) ABSTRACT

A system and method is provided for remotely controlling and interacting with a multimedia device using a mobile phone. This is accomplished by utilizing cell and mobile phones capable of establishing persistent Internet connections. A software application is provided for the mobile phone which receives inputs entered by a user on the mobile phone's keypad and translates the inputs into commands that are recognized by a multimedia device. For example, the multimedia device may be a television, set top box, or a digital video recorder such as a Tivo or ReplayTV. The software application transmits the data input by the user to the device, either directly, or through at least one central server. Mapping of the commands entered on the mobile phone into commands recognized by the remote device may occur on the phone, at a central server, or at the device itself.

2 Claims, 5 Drawing Sheets

U.S. PATENT DOCUMENTS

| | | | |
|---|---|---|---|
| 5,901,246 A | 5/1999 | Hoffberg et al. | |
| 5,901,366 A * | 5/1999 | Nakano et al. | 455/550.1 |
| 5,903,259 A | 5/1999 | Brusky et al. | |
| 5,905,856 A | 5/1999 | Ottensooser | |
| 5,949,345 A | 9/1999 | Beckert et al. | |
| 5,956,025 A * | 9/1999 | Goulden et al. | 715/716 |
| 5,963,624 A * | 10/1999 | Pope | 379/110.01 |
| 5,964,660 A * | 10/1999 | James et al. | 463/1 |
| 6,009,363 A | 12/1999 | Beckert et al. | |
| 6,020,881 A * | 2/2000 | Naughton et al. | 715/740 |
| 6,021,324 A * | 2/2000 | Sizer et al. | 455/403 |
| 6,064,666 A | 5/2000 | Willner | |
| 6,081,750 A | 6/2000 | Hoffberg et al. | |
| 6,085,112 A * | 7/2000 | Kleinschmidt et al. | 455/556.1 |
| 6,159,100 A * | 12/2000 | Smith | 463/42 |
| 6,175,789 B1 | 1/2001 | Beckert et al. | |
| 6,184,804 B1 | 2/2001 | Harrison | |
| 6,185,288 B1 | 2/2001 | Wong | |
| 6,202,008 B1 | 3/2001 | Beckert et al. | |
| 6,243,740 B1 | 6/2001 | Minneman et al. | |
| 6,289,382 B1 | 9/2001 | Bowman-Amuah | |
| 6,308,083 B2 * | 10/2001 | King | 455/556.1 |
| 6,314,457 B1 | 11/2001 | Schena et al. | |
| 6,332,163 B1 | 12/2001 | Bowman-Amuah | |
| 6,339,832 B1 | 1/2002 | Bowman-Amuah | |
| 6,349,246 B1 | 2/2002 | Smith et al. | |
| 6,356,442 B1 | 3/2002 | Lunsford | |
| 6,370,371 B1 | 4/2002 | Sorrells et al. | |
| 6,371,854 B1 * | 4/2002 | Ikeda et al. | 463/42 |
| 6,393,297 B1 * | 5/2002 | Song | 455/466 |
| 6,434,398 B1 | 8/2002 | Inselberg | |
| 6,445,933 B1 * | 9/2002 | Pettit | 455/556.1 |
| 6,487,422 B1 * | 11/2002 | Lee | 455/550.1 |
| 6,496,575 B1 * | 12/2002 | Vasell et al. | 379/102.05 |
| 6,510,212 B2 * | 1/2003 | Ito et al. | 379/102.03 |
| 6,524,189 B1 * | 2/2003 | Rautila | 463/42 |
| 6,580,950 B1 | 6/2003 | Johnson et al. | 700/17 |
| 6,585,596 B1 * | 7/2003 | Leifer et al. | 463/39 |
| 6,684,062 B1 * | 1/2004 | Gosior et al. | 455/73 |
| 6,793,580 B2 * | 9/2004 | Sinclair et al. | 463/39 |
| 6,794,992 B1 * | 9/2004 | Rogers | 340/825.25 |
| 6,803,676 B2 * | 10/2004 | Tanaka et al. | 307/28 |
| 6,827,648 B2 * | 12/2004 | Peng et al. | 463/36 |
| 6,850,149 B2 * | 2/2005 | Park | 340/7.1 |
| 6,874,029 B2 * | 3/2005 | Hutcheson et al. | 709/227 |
| 6,882,326 B2 * | 4/2005 | Hirayama et al. | 345/1.1 |
| 6,893,347 B1 * | 5/2005 | Zilliacus et al. | 463/41 |
| 6,924,727 B2 * | 8/2005 | Nagaoka et al. | 340/3.1 |
| 6,943,681 B2 * | 9/2005 | Rezvani et al. | 340/506 |
| 7,056,217 B1 * | 6/2006 | Pelkey et al. | 463/43 |
| 2001/0019953 A1 * | 9/2001 | Furukawa et al. | 455/420 |
| 2001/0030597 A1 * | 10/2001 | Inoue et al. | 340/3.7 |
| 2002/0032048 A1 * | 3/2002 | Kitao et al. | 455/569 |
| 2002/0044199 A1 * | 4/2002 | Barzebar et al. | 348/14.01 |
| 2002/0063633 A1 | 5/2002 | Park | |
| 2002/0086730 A1 * | 7/2002 | Nakai | 463/41 |
| 2002/0094869 A1 * | 7/2002 | Harkham | 463/42 |
| 2002/0105229 A1 * | 8/2002 | Tanaka et al. | 307/29 |
| 2002/0110246 A1 * | 8/2002 | Gosior et al. | 381/2 |
| 2002/0111698 A1 * | 8/2002 | Graziano et al. | 700/17 |
| 2002/0160838 A1 * | 10/2002 | Kim | 463/42 |
| 2002/0165024 A1 * | 11/2002 | Puskala | 463/40 |
| 2003/0018753 A1 | 1/2003 | Seki | |
| 2003/0037341 A1 * | 2/2003 | Van Der Meulen | 725/143 |
| 2003/0092488 A1 * | 5/2003 | Cheng | 463/31 |
| 2003/0130009 A1 * | 7/2003 | Kung | 455/557 |
| 2003/0139193 A1 * | 7/2003 | Buckley | 455/466 |
| 2003/0179746 A1 * | 9/2003 | Moon et al. | 370/352 |
| 2003/0195023 A1 * | 10/2003 | Di Cesare | 463/9 |
| 2004/0038692 A1 * | 2/2004 | Muzaffar | 455/502 |
| 2004/0117038 A1 * | 6/2004 | Karaoguz et al. | 700/11 |
| 2004/0130291 A1 * | 7/2004 | Hsu | 320/111 |
| 2004/0152517 A1 * | 8/2004 | Hardisty et al. | 463/42 |
| 2004/0186771 A1 * | 9/2004 | Squires | 705/14 |
| 2004/0209687 A1 * | 10/2004 | Peng et al. | 463/36 |

FOREIGN PATENT DOCUMENTS

| | | |
|---|---|---|
| JP | 2003030072 | 3/2001 |
| JP | 2002010360 | 1/2002 |
| JP | 2002176610 | 6/2002 |
| JP | 2002262372 | 9/2002 |
| JP | 2002312524 | 10/2002 |
| WO | WO 9727674 | 7/1997 |
| WO | WO 9854021 | 12/1998 |
| WO | WO 9926330 | 5/1999 |
| WO | WO 0007849 | 2/2000 |
| WO | WO 0023956 | 4/2000 |
| WO | WO 0024119 | 4/2000 |
| WO | WO 0078057 | 12/2000 |
| WO | WO 0107993 | 2/2001 |
| WO | WO 0123982 | 4/2001 |
| WO | WO 0135391 | 5/2001 |
| WO | WO 0144912 | 6/2001 |
| WO | WO 0154044 | 7/2001 |
| WO | WO 0154087 | 7/2001 |
| WO | WO 0161483 | 8/2001 |
| WO | WO 0169860 | 9/2001 |
| WO | WO 0169882 | 9/2001 |
| WO | WO 0175629 | 10/2001 |
| WO | WO 0177906 | 10/2001 |
| WO | WO 0177907 | 10/2001 |
| WO | WO 0184274 | 11/2001 |
| WO | WO 0191100 | 11/2001 |
| WO | WO 0191109 | 11/2001 |
| WO | WO 0198936 | 12/2001 |
| WO | WO 0201833 | 1/2002 |
| WO | WO 0213129 | 2/2002 |
| WO | WO 0215611 | 2/2002 |
| WO | WO 0217252 | 2/2002 |

* cited by examiner

MOBILE PHONE MULTIMEDIA CONTROLLER

RELATED APPLICATIONS

This application claims priority to U.S. Provisional Application No. 60/467,256 entitled "Cell Phone Multimedia Controller", filed on Apr. 30, 2003, which is herein incorporated by reference in its entirety.

BACKGROUND

1. Field

This disclosure relates to new systems and methods for remotely interacting with or controlling multimedia devices.

2. General Background and State of the Art

Currently, many interactive experiences are limited to more widespread use due to the cost and design of the user input devices required for the interactive experience. For example, the number of controller ports limits the number of simultaneous players on video game consoles. Touch screens are limited to only one or two users at a time.

There are examples of video games in which twenty-or so people play a game on a single, large screen. The game controls are installed in the seats and were wired directly to the system playing the game. However, in large public venues, like theme parks, it is quite cost prohibitive to provide custom input mechanisms for crowds of people.

Remote controls and video-game controllers are well understood technology. On TV set-top boxes, if multi-controller systems are offered at all, the remote controls are limited by the strength of their signal emitters and the number of unique device ID's available.

It is therefore desired to create location-based multimedia and game applications with a shared user interface. The user interface should be extremely inexpensive to the content creators and venues. The interface needs to provide simultaneous user participation with an infinitely scalable number of users.

SUMMARY

The present disclosure therefore provides a method of controlling and interacting with a multimedia device though use of a mobile phone. Software is provided to a mobile phone which simulates the use of a remote control. This is accomplished by utilizing cellular and/or mobile phones capable of establishing Internet connections. A software application is provided for the mobile phone which receives inputs entered by a user on the mobile phone's keypad and translates the inputs into commands that are recognized by a multimedia device. For example, the multimedia device may be a television, set top box, or a digital video recorder such as a Tivo or ReplayTV. The software application transmits the data input by the user to the device, either directly, or through at least one central server. Mapping of the commands entered on the mobile phone into commands recognized by the remote device may occur on the phone, at a central server, or at the device itself. A user can thereby utilize their mobile phone to instruct devices at home such as their television or audio/video recorder in the same way as if they were at home using the device's remote control.

The present invention provides a method whereby 2½ and 3G mobile phones are used to control separate multimedia devices. 3G is a term for a collection of standards and technologies which are used to enhance performance on mobile phone networks and increase data speed. 3G wireless promises increased bandwidth of up to 384 Kbps when a device is stationary or moving at pedestrian speed, 128 Kbps in a car, and 2 Mbps in fixed applications. 3G will work over wireless air interfaces such as WCDMA, GSM(GPRS), and TDMA. The new EDGE (for Enhanced Data for GSM Environment air interface has been developed specifically to meet the bandwidth needs of 3G mobile phones.

Using the wireless Internet connectivity built into these phones, a mobile phone becomes a ubiquitous, portable multimedia and game controller. This allows users a portable, hugely scalable, shared multimedia experiences.

For example, use of the present invention could enable large audiences upwards of 800 people to simultaneously play a game displayed on an IMAX screen. What makes this idea important is that the IMAX venue would not have to purchase, install, distribute or maintain the game controllers for all those people. This cost savings makes new and exciting interactive multimedia shows financially feasible. New shows could easily be developed for this system.

The present invention could be used to interact and control many different types of multimedia devices. The present invention could be used to interact with features or applications on one's home computer. A set top box, or video recorder such as a Tivo or ReplayTV unit could be controlled or directed to record remotely through the use of one's mobile phone. In general, any device connected to a network could be remotely operated through commands on a mobile phone.

The foregoing and other objects, features, and advantages of the present invention will be become apparent from a reading of the following detailed description of exemplary embodiments thereof, which illustrate the features and advantages of the invention in conjunction with references to the accompanying drawing Figures.

DETAILED DESCRIPTION

In the following description of exemplary embodiments, reference is made to the accompanying drawings which form a part thereof, and in which are shown by way of illustration specific embodiments in which the present disclosure may be practiced. It is to be understood that other embodiments may be utilized and structural and functional changes may be made without departing from the scope of the present disclosure.

A system and method is provided for remotely controlling and interacting with a multimedia device using a mobile phone. This is accomplished by utilizing cellular and/or mobile phones capable of establishing persistent Internet connections. A software application is provided for the mobile phone which receives inputs entered by a user on the mobile phone's keypad and translates the inputs into commands that are recognized by a multimedia device. For example, the multimedia device may be a television, set top box, or a digital video recorder such as a Tivo or ReplayTV. The software application transmits the data input by the user to the device, either directly, or through at least one central server. Mapping of the commands entered on the mobile phone into commands recognized by the remote device may occur on the phone, at a central server, or at the device itself. A user can thereby utilize their mobile phone to instruct devices at home such as their television or audio/video recorder in the same way as if they were at home using the device's remote control.

Figure 1:
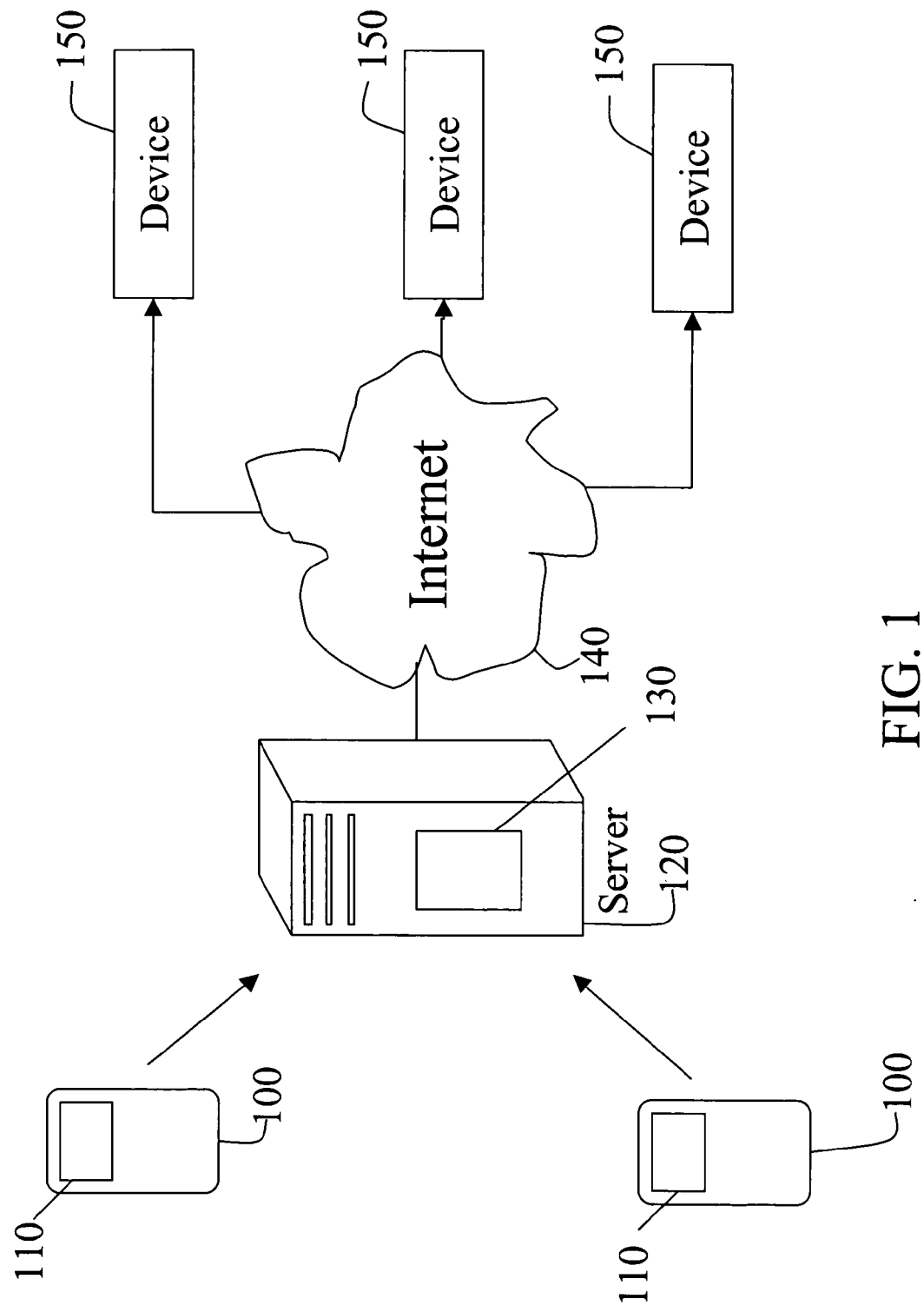
FIG. 1 is a block diagram of an exemplary embodiment in accordance with the present disclosure.

A modified block diagram of an exemplary embodiment for remotely controlling devices using a mobile phone is illustrated in FIG. 1.

Figure 2:
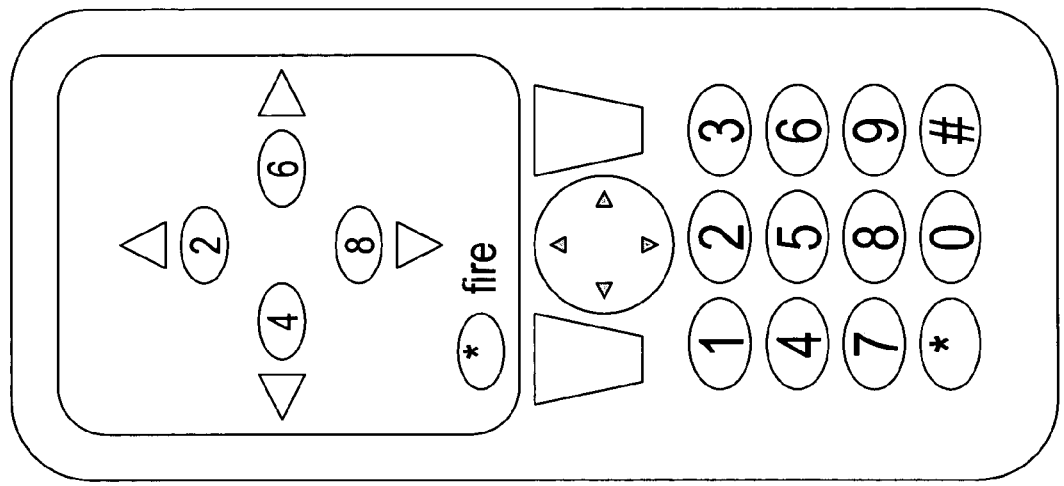
FIG. 2 illustrates an exemplary embodiment of a user interface as displayed by the client application.
Figure 2:
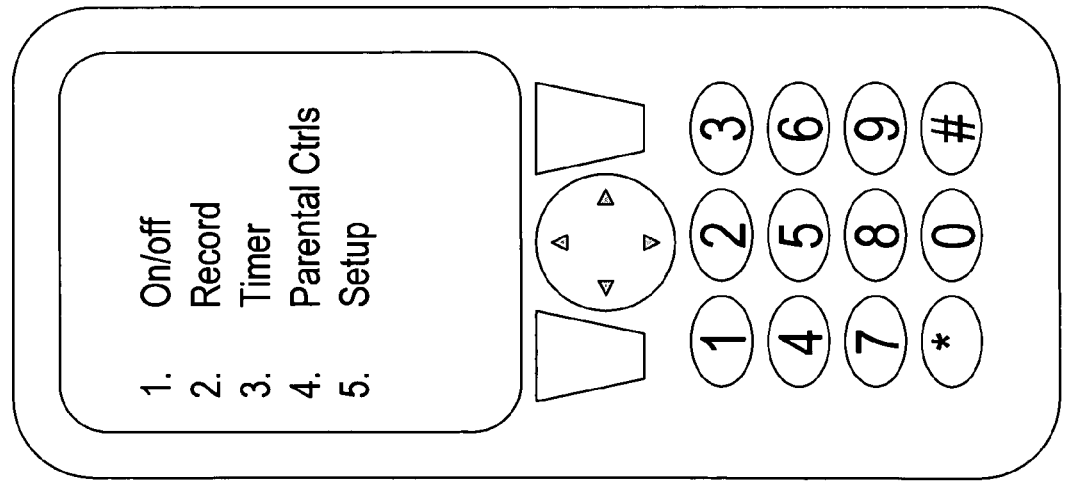

A plurality of mobile phones 100 are shown. Client application 110 is installed on mobile phone 100. In an exemplary embodiment, client application 110 provides a user interface on the mobile phone display which provides the user with the ability to enter commands to a remote device. For example, the application 110 may list a number of commands and the input key, such as the number on the key pad that corresponds to each command. FIG. 2 shows examples of what a user interface might look like.

In one embodiment, the client application 110 is a single application which provides options to enter commands for a plurality of different remote devices. In another embodiment, the mobile phone may have several client applications 110, one for each remote device.

In an exemplary embodiment, the application 110 resident on the mobile phone is developed in Java 2 Platform Micro Edition (J2ME), based on Sun Microsystem's Internet-standard Java™ programming language. The J2ME platform is the java platform for consumer and embedded devices such as mobile phones, PDA's, TV set top boxes, and in-vehicle telematic systems. Mobile phones such as the Motorola i50sx, i85s, and the i90c are just a few examples of mobile phones currently loaded with the Java 2 Micro Edition software. The J2ME platform provides a broad range of networking protocols.

A user could download the application over the wireless network for installation on their phone. Alternatively, the application could be pre-installed on the mobile phone prior to its purchase by the user. Alternatively, the user could download the software using an Internet connection to their desktop or laptop computer, and later transfer the program to their mobile phone for installation. For example, data transfer cables can often be purchased for transmitting data from a computer to a mobile phone. Also, Bluetooth (IEEE 802.15) and infrared communications are other methods which allow for transmission of data between a computer and mobile phone.

The client application 110 accepts inputs from the user. In one embodiment, the program generates an extremely small event identifier when an input key is pressed on the mobile phone. For instance, pressing the '1' key on the mobile phone might generate the hexadecimal identifier 0x31. The identifier is sent via the mobile phone network to a server 120 located at a central location.

The address of server 120 may be hard coded into the client application 110 on the mobile phone. In addition to IP based protocols, SMS, or Short Messaging Service protocols could also be used to transmit data from the mobile phone.

Server 120 comprises further software 130 configured to receive data from the mobile phone and to convert the data into the proper format such that it is recognized by a multimedia device. Server 120 may also contain a list of the known devices to be controlled from the user's mobile phone. Once the data received from the mobile phone has been converted into a command recognizable by a device, it is forwarded on to the appropriate device, as indicated at 150.

Figure 3:
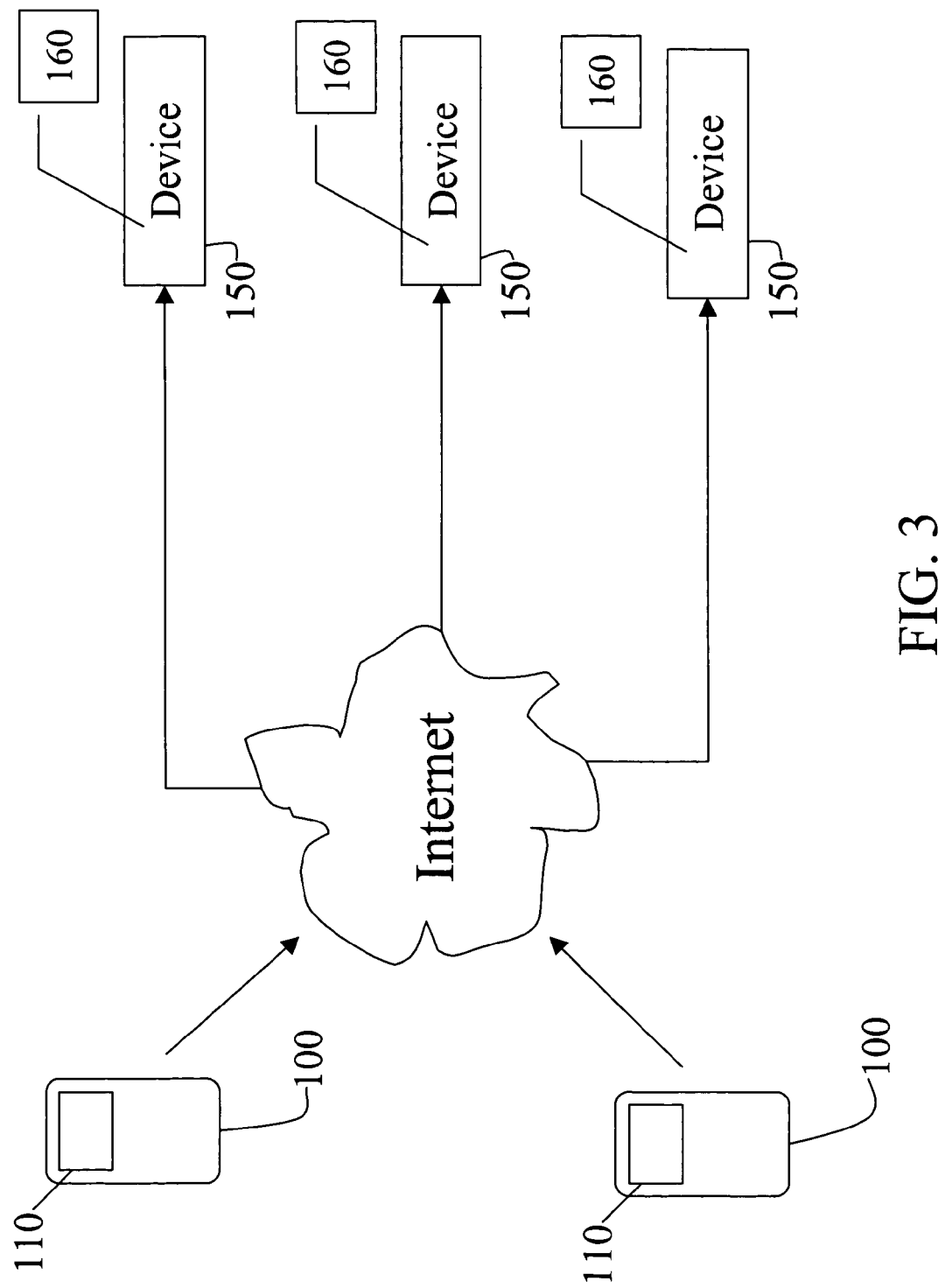
FIG. 3 is a block diagram of an exemplary embodiment in accordance with the present disclosure.

In another embodiment, the identifier is sent from the mobile phone through the mobile network and the Internet to the multimedia device. FIG. 3 illustrates such an embodiment. In such an embodiment, the multimedia device 150 further comprises software 160 that interprets the identifier generated by the mobile phone 100 as a remote control command. Based on the unique IP address of the mobile phone, the software on the multimedia device is able to associate the command to the desired action on the device.

Figure 4:
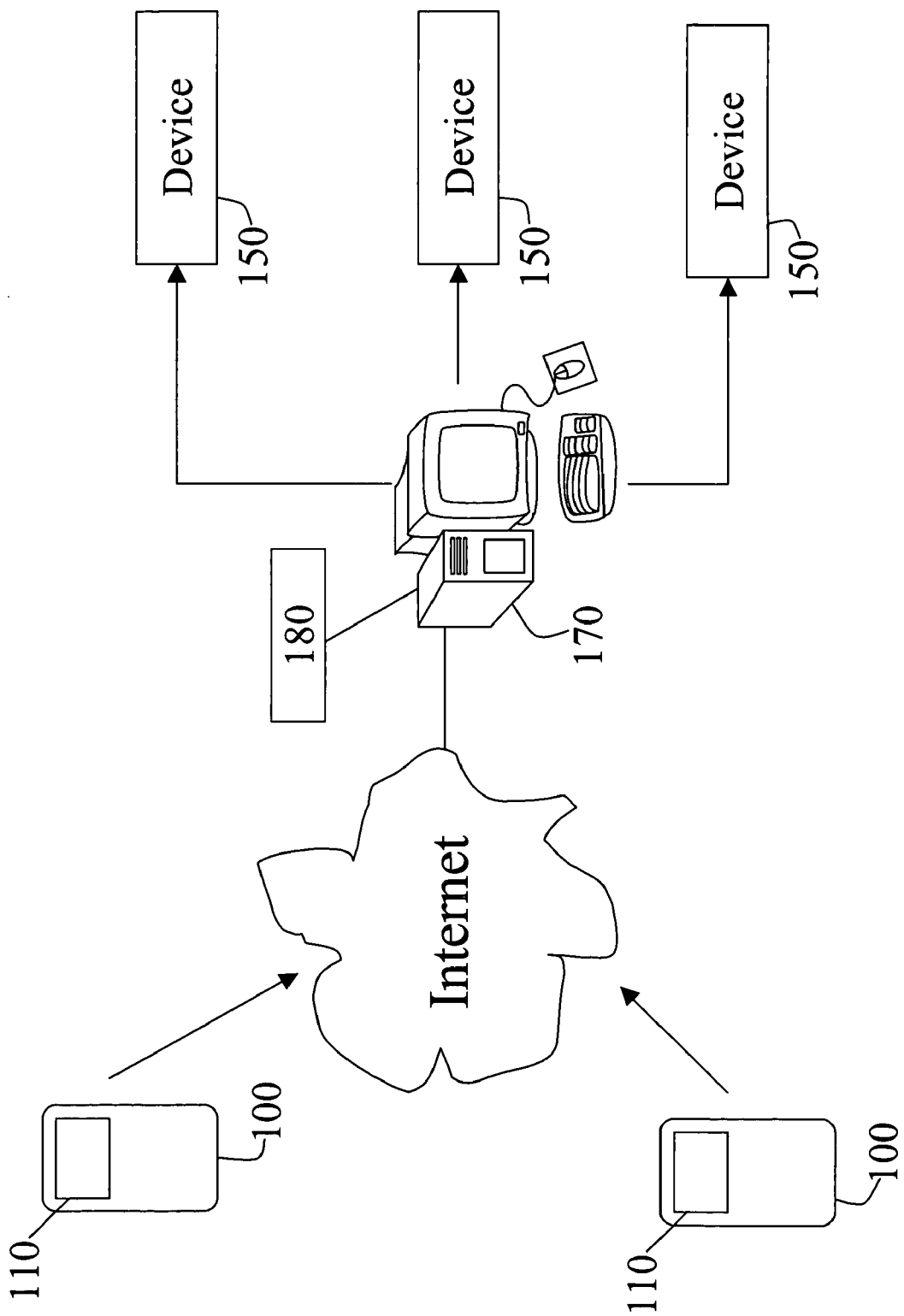
FIG. 4 is a block diagram of an exemplary embodiment in accordance with the present disclosure.

Alternatively, the mobile phone can connect to multimedia devices through a computer (such as a PC) running software that accepts multiple IP connections. FIG. 4 illustrates an exemplary embodiment whereby a computer 170 is connected to one or more devices 150. Computer 170 further runs software 180 that is configured to receive messages from a mobile phone 100 and interpret the messages into commands recognized by one of the devices 150. Computer 170 may therefore be a home computer, and a plurality of devices 150 may be connected to the computer. The devices may be connected as peripheral devices such as through as USB or serial connection. The devices may also be connected to the computer through a wired or wireless network.

In yet another embodiment, the client application 110 present on the mobile phone 100 is configured such that each key press generates the actual command as recognized by the remote device. The client application resident on the mobile phone interprets the commands input by the user directly into commands as recognized by the remote device. The commands can then be sent directly to the device.

The present invention could be used in a number of applications.

Figure 5:
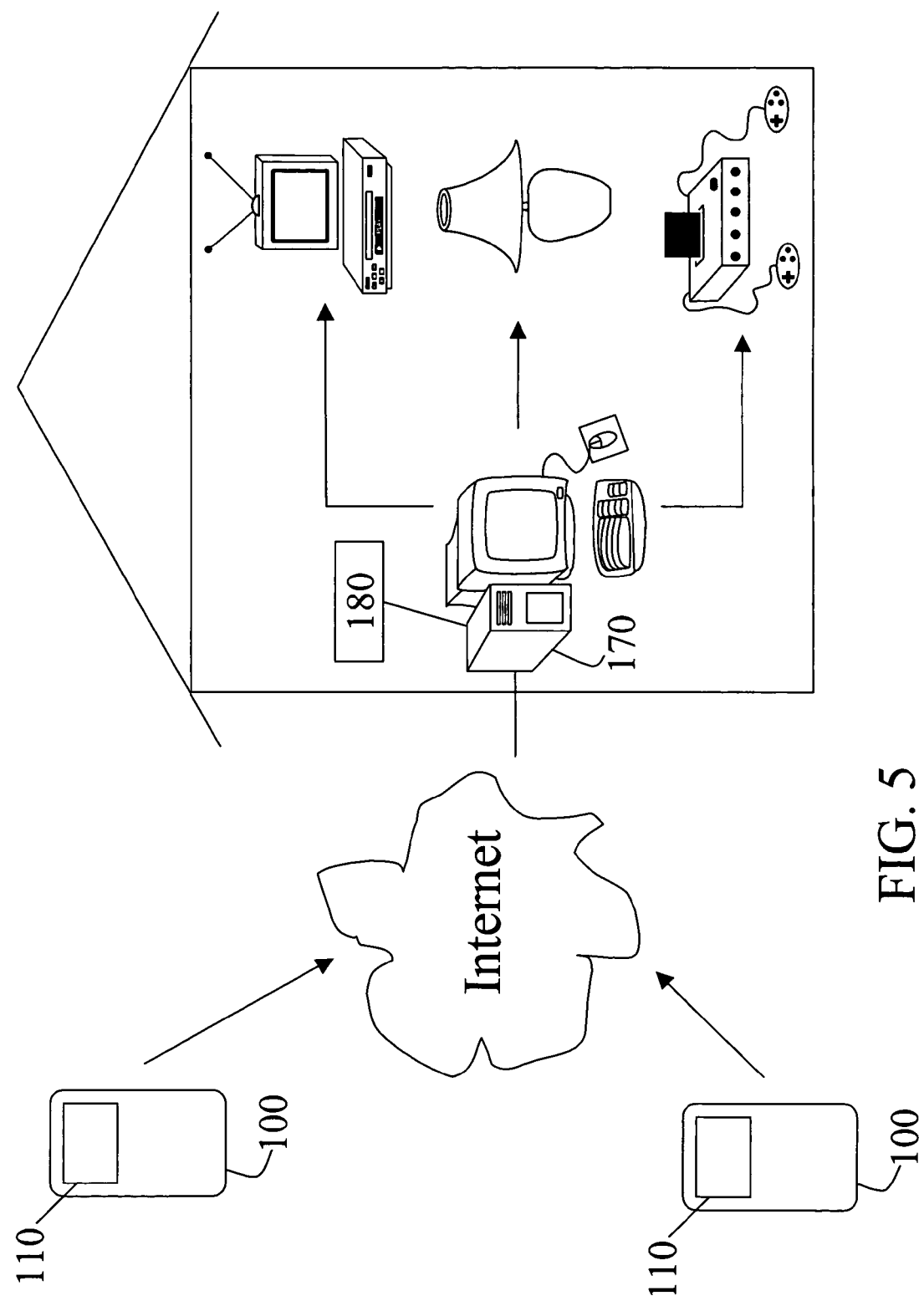
FIG. 5 is a block diagram of an exemplary embodiment in accordance with the present disclosure.

FIG. 5 illustrates an example of how a user could use a mobile phone to remotely control and interact with one or more of a plurality of devices located within their own home. For example, a home computer running software in accordance with the present disclosure can be connected with a plurality of devices in the user's home. For example, home electronics such as a television, set top box, digital video recorder such as Tivo or ReplayTV, VCR, DVD player or recorder, or home stereo system could be connected to the home computer. Furthermore, home appliances such as light systems could be controlled.

Software resident on the home computer could also be accessed.

For example, a game present on a computer could be played remotely by using one's mobile phone. In an exemplary embodiment, a java enabled mobile phone such as the Motorola i85s phone, and a J2ME application running on the phone acts as a game controller for an application running on a PC. For example, the phone application connects by way of a small server program to a simple flash movie. The movie is of an airplane flying. Pressing buttons on the phone sends messages to the running Flash movie. These messages cause the plane to slow down or speed up, move up and down and fire a missile.

Furthermore, the number of players allowed to participate in game play can be increased. For example, if 10 people are playing a spaceship shooting game, player 5 controls the red spaceship. Player 5 presses the "Fire" button on his mobile phone (for argument's sake, the "#" key). The application interprets the key-press as hex identifier 0x23. This is sent via IP to the multimedia computer running the game. The application running on the computer knows that it has received the "Fire" command from the IP address of player 5 and fires the lasers on the red spaceship. Because there is two-way communication between the mobile phone and the computer, the computer can send messages back to the mobile phone. In the spaceship example, the multimedia computer might send data used to simulate radar images of nearby opponents.

In another embodiment, a mobile phone is used to control a location-based-entertainment prototype. A connection is made directly from the mobile phone to the application. By sending application messages from a mobile phone, pre-defined 3D animations and sound effects of well-known animated characters is accomplished.

The present invention could also be used to inexpensively increase the interactivity in theme-park ride queues. Queue entertainment could be developed without worrying about the expense and durability of controllers. Games could be displayed on monitors located in the ride queue and guests could use their own cell phones in line to interact with the game displayed on the monitor.

The present invention could be used to implement large-scale "Who Wants to Be a Millionaire?" type attractions. The present invention could also be used to cheaply create large-scale multi-user experiences using large primary display screens. The present disclosure could be applied equally as well for quiz games, or shared multimedia experiences, like the crowd painting pictures on the water wall of the Disneyland Fantasmic show.

The foregoing description of the preferred embodiments has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims appended hereto.

What is claimed:

1. A central server, comprising:
a modem that establishes a network connection with a mobile phone and another network connection with a remote device separate from the mobile phone, the modem being configured to receive remote device commands form the mobile phone, the mobile phone being configured to simulate a remote control of the remote device and issue standard mobile phone commands being mapped by software on the mobile phone to remote device commands, the remote device commands being used to operate the remote device; and
a processor that transmits remote device commands to operate the remote device, the processor being configured to convey the remote device commands received from the mobile phone to the remote device in a format that can be recognized by the remote device:
wherein the central server is operatively connected to an audience display;
wherein the remote device comprises a multiplayer game device;
wherein the remote device commands correspond to multiplayer game commands configured to operate objects within a multiplayer game displayed on the audience display;
wherein the audience display comprises a queue display, and
wherein the queue display is located within a theme park.

2. The central server according to claim 1, wherein the central server is further configured to transmit mapping software to a plurality of mobile phones such that the plurality of mobile phones simulate remote controllers for the multiplayer game device.

* * * * *